UNITED STATES PATENT OFFICE.

ERIC BERKELEY HIGGINS, OF WALLASEY, ENGLAND.

REDUCTION OF ORGANIC COMPOUNDS.

1,170,814.   Specification of Letters Patent.   Patented Feb. 8, 1916.

No Drawing.   Application filed May 15, 1913.   Serial No. 767,814.

*To all whom it may concern:*

Be it known that I, ERIC BERKELEY HIGGINS, Ph. D., a subject of the King of Great Britain and Ireland, residing at Wallasey, Cheshire, England, have invented certain new and useful Improvements in and Relating to the Reduction of Organic Compounds, of which the following is a specification.

This invention relates to a process for the reduction of organic compounds such, for example, as fatty acids and their esters.

Processes are known in which fatty acids and other bodies are saturated in the presence of gaseous hydrogen and a catalyst, and the present invention has for its object to render unnecessary the use of gaseous hydrogen for the purpose, and to effect reduction by the use of a re-agent which itself contains the hydrogen necessary and which at the same time may serve as the catalyst. According to the invention I effect the reduction of such compounds in the presence of a metallic formate, without employing gaseous hydrogen.

In carrying the invention into effect in its application to unsaturated fatty acids or their esters, these bodies are intimately mixed with the salt of formic acid and a catalytic substance (or a body capable of forming a catalytic substance by the action of the formate under the conditions of the treatment) or a catalytic formate at the ordinary temperature, and the mixture is then placed in a vessel capable of being rendered gas-tight and preferably provided with an agitating apparatus by means of which the mixture may be stirred.

The contained air is preferably exhausted from the vessel or displaced by a non-oxidizing gas such as carbon monoxid, nitrogen, carbon dioxid or hydrogen and the temperature then carefully raised when the reaction takes place which with a monovalent salt of formic acid may, for example, be represented thus:

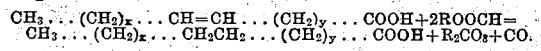

The end products vary with the formate used, that is, with some formates, the resulting metallic carbonate is unstable and carbon dioxid is evolved as well as carbon monoxid. In any case, however, the saturation of the unsaturated fatty acid or its ester is brought about in essentially the same manner. Owing to the evolution of carbon dioxid or carbon monoxid or both, considerable pressures are generated.

The following are various practical examples of the manner in which the invention may be carried into effect: 1. Nickel formate may be used as the reducing agent and the catalyst. 2. Zinc formate may be used as the reducing agent together with a known catalyst. 3. Zinc formate may be used as the reducing agent and may be mixed, for example, with palladium chlorid which under the conditions of working is converted into a catalytic substance by the action of the zinc formate.

The heating must be conducted with care, as local superheating is liable to cause spontaneous formation of oxalate from the formate and is liable to produce explosion. For this reason the apparatus must be provided with necessary safety devices.

The reaction can be conducted practically quantitatively, but for commercial purposes an excess of the re-agent over the theoretical amount necessary is preferably employed. The bodies taking part in the action should be dry.

As regards temperature, this may vary with the formate or mixture of formates or other re-agents employed but in general may be in the neighborhood of 20° below the point at which the formate used spontaneously decomposes to the oxalate under the pressure existing in the apparatus at the time of so heating.

The velocity of the reaction depends (other things being equal) upon the proportion and character of the catalyzer used.

In most cases the base from which the formate is originally prepared can be recovered from the reaction product and the formate be re-synthesized therefrom for re-use in the known manner for which purpose of re-synthesis the carbon monoxide evolved by the reduction may serve wholly or in part.

What I claim as my invention and desire to secure by Letters Patent is:—

1. A process for the hydrogenation of unsaturated organic compounds by catalysis, consisting in treating the said compounds by admixture with a formate and with a catalyst, and by heating the mixture, substantially as described.

2. A process for the hydrogenation of unsaturated organic compounds by catalysis, consisting in treating the said compounds by admixture with a formate and with a catalyst, and by heating the mixture in a vessel from which air has been exhausted, substantially as described.

3. A process for the hydrogenation of unsaturated organic compounds by catalysis, consisting in treating the said compounds by admixture with a formate and with a catalyst and by heating the mixture in a vessel in the presence of a non-oxidizing gas that has no chemical action on the catalyst or body to be reduced; substantially as described.

4. A process for the hydrogenation of unsaturated fatty compounds containing as the essential constituent an unsaturated fatty acid radical, consisting in treating the said compounds by admixture with a formate and with a catalyst, and by heating the mixture, substantially as described.

5. A process for the hydrogenation of unsaturated fatty compounds containing as the essential constituent an unsaturated fatty acid radical, by catalysis, consisting in treating the said compounds by admixture with a formate and with a catalyst, and by heating the mixture in a vessel from which air has been exhausted, substantially as described.

6. A process for the hydrogenation of unsaturated fatty compounds containing as the essential constituent an unsaturated fatty acid radical, consisting in treating the said compounds by admixture with a formate and with a catalyst, and by heating the mixture, substantially as described.

7. A process for the hydrogenation of unsaturated organic compounds by catalysis, consisting in treating the said compounds by admixture with a formate and with a body which under the conditions of working is converted into a catalytic substance by the action of the formate used and then heating the mixture, substantially as described.

8. A process for the hydrogenation of unsaturated organic compounds by catalysis, consisting in treating the said compounds by admixture with a formate and with a body which under the conditions of working is converted into a catalytic substance by the action of the formate used, and heating the mixture in a vessel from which air has been exhausted, substantially as described.

9. A process for the hydrogenation of unsaturated fatty compounds containing as the essential constituent an unsaturated fatty acid radical, by catalysis, consisting in treating the said compounds by admixture with a formate and with a body which under the conditions of working is converted into a catalytic substance by the action of the formate used and then heating the mixture, substantially as described.

10. A process for the hydrogenation of unsaturated organic compounds by catalysis, consisting in treating the said compounds by admixture with a compound of formic acid and with a catalyst and by heating the mixture, substantially as described.

In testimony whereof I have hereunto signed my name to this specification in the presence of two subscribing witnesses.

ERIC BERKELEY HIGGINS.

Witnesses:
CHARLES G. BARKER,
NANCY THOMAS.